(12) United States Patent
Renes et al.

(10) Patent No.: US 11,444,767 B1
(45) Date of Patent: Sep. 13, 2022

(54) METHOD FOR MULTIPLYING POLYNOMIALS FOR A CRYPTOGRAPHIC OPERATION

(71) Applicant: NXP B.V., Eindhoven (NL)

(72) Inventors: Joost Roland Renes, Eindhoven (NL); Joppe Willem Bos, Wijgmaal (BE); Tobias Schneider, Styria (AT); Christine van Vredendaal, Veldhoven (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 17/190,986

(22) Filed: Mar. 3, 2021

(51) Int. Cl.
*H04L 9/30* (2006.01)
*G06F 7/72* (2006.01)

(52) U.S. Cl.
CPC ............ *H04L 9/3093* (2013.01); *G06F 7/724* (2013.01)

(58) Field of Classification Search
CPC ... H04L 29/06; H04L 9/00; H04L 9/30; H04L 9/3093; H04L 9/3026; H04L 9/008; H04L 9/0816; H04L 9/3236; H04L 9/0891; H04L 9/0894; H03M 13/15; H03M 13/00; H03M 13/151; G06F 7/724
See application file for complete search history.

(56) References Cited

U.S. PATENT DOCUMENTS

| 3,278,729 | A  | * | 10/1966 | Chien ............. | H03M 13/151 714/762 |
| 7,346,159 | B2 | * | 3/2008  | Gura .............. | G06F 7/724 380/28 |
| 7,787,623 | B2 | * | 8/2010  | Akiyama .......... | H04L 9/002 380/46 |

(Continued)

FOREIGN PATENT DOCUMENTS

| CN | 110519058 B | 11/2019 |
| KR | 101952547 B1 | 2/2019 |

OTHER PUBLICATIONS

Journal of Symbolic Computation 44 (2009) pp. 1502-1510; Faster polynomial multiplication via multipoint Kronecker substitution by David Harve.

(Continued)

*Primary Examiner* — Samson B Lemma

(57) ABSTRACT

Various embodiments relate to a method for multiplying a first and a second polynomial in the ring $\mathbb{Z}[X]/(X^N-1)$ to perform a cryptographic operation in a data processing system, the method for use in a processor of the data processing system, including: receiving the first polynomial and the second polynomial by the processor; mapping the first polynomial into a third polynomial in a first ring and a fourth polynomial in a second ring using a map; mapping the second polynomial into a fifth polynomial in the first ring and a sixth polynomial in the second ring using the map; multiplying the third polynomial in the first ring with the fifth polynomial in the first ring to produce a first multiplication result; multiplying the fourth polynomial in the second ring with the sixth polynomial in the second ring to produce a second multiplication result using Renes multiplication; and combining the first multiplication result and the second multiplication result using the map.

14 Claims, 3 Drawing Sheets

(56) References Cited

U.S. PATENT DOCUMENTS

| | | | | |
|---|---|---|---|---|
| 8,311,215 | B2* | 11/2012 | Akiyama | H04L 9/3026 380/30 |
| 8,477,935 | B2 | 7/2013 | Langendoerfer et al. | |
| 8,532,289 | B2* | 9/2013 | Gentry | H04L 9/3026 380/44 |
| 9,425,961 | B2* | 8/2016 | Susella | H04L 9/003 |
| 9,596,083 | B2* | 3/2017 | Yasuda | H04L 9/008 |
| 9,928,037 | B2* | 3/2018 | Fenney | G06F 7/727 |
| 10,027,475 | B2* | 7/2018 | Rietman | H04L 9/3093 |
| 2006/0107043 | A1* | 5/2006 | Kim | H04L 9/3236 713/163 |
| 2007/0136409 | A1 | 6/2007 | Tonomura et al. | |
| 2007/0230692 | A1* | 10/2007 | Akiyama | H04L 9/002 380/44 |
| 2010/0020964 | A1* | 1/2010 | Horie | G06F 7/725 380/44 |
| 2010/0226496 | A1* | 9/2010 | Akiyama | H04L 9/3093 380/28 |
| 2010/0329447 | A1* | 12/2010 | Akiyama | H04L 9/3026 380/28 |
| 2015/0270967 | A1* | 9/2015 | Susella | H04L 9/14 380/30 |
| 2015/0318991 | A1* | 11/2015 | Yasuda | H04L 9/008 380/28 |
| 2016/0119120 | A1* | 4/2016 | Wang | H04L 9/0618 380/30 |
| 2016/0299743 | A1* | 10/2016 | Fenney | G06F 7/722 |
| 2017/0187519 | A1* | 6/2017 | Murdica | H04L 9/0631 |
| 2021/0279040 | A1* | 9/2021 | Yonemura | H04L 9/3093 |
| 2021/0377026 | A1* | 12/2021 | Renes | G06F 7/5324 |

OTHER PUBLICATIONS

Espacenet Bibliographic data: KR101952547 (B1)—Feb. 26, 2019 dated Dec. 18, 2020; 21 pgs.

On Lattices, Learning with Errors, Random Linear Codes, and Cryptography by Oded Regev; May 2, 2009; 37 pgs.

Computer Security Resource Center; Post-Quantum Cryptography; created Jan. 3, 2017, updated Jan. 11, 2021; 2 pgs.

Schonhage, A. "Asymptotically Fast Algorithms for the Numerical Multiplication and Division of Polynomials with Complex Coefficients;" May 28, 2005; 13 pgs.

Kronecker, L. "Grundzuge Einer Arithmetischen Theorie der Algebraischen Grosssen;" Sep. 10, 1881; Journal Fur Die Reine Und Angewandte Mathematik 92; 1882 [German Translation to English Unavailable. ].

U.S. Appl. No. 16/884,136, filed May 27, 2020, titled "Method for Multiplying Polynomials for a Cryptographic Operation"; Inventors: Joost Roland Renes et al.

Albrecht, Martin R. et al.; "Implementing RLWE-based Schemes Using an RSA Co-Processor"; IACR Transactions on Cryptographic Hardware and Embedded Systems, Aug. 25-28, 2019, Atlanta, Georgia; DOI: https://doi.org/10.13154/tches.v2019.i1.169-208.

Lyubashesky, Vadim et al.; "On Ideal Lattices and Learning with Errors Over Rings"; Advances in Cryptology—EUROCRYPT 2010.

* cited by examiner

US 11,444,767 B1

METHOD FOR MULTIPLYING POLYNOMIALS FOR A CRYPTOGRAPHIC OPERATION

TECHNICAL FIELD

Various exemplary embodiments disclosed herein relate generally to method for multiplying polynomials for a cryptographic operation.

BACKGROUND

The development of quantum computers threatens the security of certain currently widely used public key cryptography algorithms such as the RSA (Rivest-Shamir-Adleman) algorithm. Most recently, advances in quantum computing have accelerated the research into "post-quantum cryptography" schemes, that is, new cryptography schemes that are believed to be secure even when faced with an attacker using a quantum computer. There are various families of problems that are being considered to instantiate these post-quantum cryptographic approaches. One approach is based on the hardness of certain lattice problems. That is, solving these difficult lattice problems compromises the cryptography. When implemented, computationally expensive operations of some proposed lattice-based post-quantum cryptography schemes include arithmetic with polynomials with integer coefficients. Some currently used public-key cryptography algorithms require arithmetic of large integers, where the integers may include hundreds or thousands of bits. In contrast, the coefficients used for polynomial multiplication for lattice-based algorithms may be much smaller, e.g., 32 bits or less. Typically, special purpose processors are implemented in a data processing system to offload the computationally difficult problems from the main processor of the system. However, the special purpose co-processors currently used to implement existing RSA or Elliptic-curve cryptography (ECC) algorithms cannot efficiently and quickly perform the polynomial multiplications required for lattice-based cryptography. Developing new special-purpose co-processors to perform the computations needed by lattice-based post-quantum cryptography efficiently and quickly is expensive and time consuming.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for multiplying a first and a second polynomial in the ring $\mathbb{Z}[X]/(X^N-1)$ to perform a cryptographic operation in a data processing system, the method for use in a processor of the data processing system, including: receiving the first polynomial and the second polynomial by the processor; mapping the first polynomial into a third polynomial in a first ring and a fourth polynomial in a second ring using a map; mapping the second polynomial into a fifth polynomial in the first ring and a sixth polynomial in the second ring using the map; multiplying the third polynomial in the first ring with the fifth polynomial in the first ring to produce a first multiplication result; multiplying the fourth polynomial in the second ring with the sixth polynomial in the second ring to produce a second multiplication result using Renes multiplication; and combining the first multiplication result and the second multiplication result using the map.

Various embodiments are described, wherein the first ring is $\mathbb{Z}[X]/(X^{N/2}-1)$, and the second ring is $\mathbb{Z}[X]/(X^{N/2}+1)$.

Various embodiments are described, wherein the first polynomial f is $f=f_0+X^{N/2} f_1$ in the ring $\mathbb{Z}[X]/(X^N-1)$, wherein $f_0$ is a lower portion of the first polynomial and $f_1$ is an upper portion of the first polynomial, the third polynomial is $f_0+f_1$ in the first ring, and fourth polynomial is $f_0-f_1$ in the second ring.

Various embodiments are described, wherein the first polynomial and the second polynomial are of order N and the third polynomial, fourth polynomial, fifth polynomial, and sixth polynomial are of order N/2.

Various embodiments are described, wherein multiplying the third polynomial in the first ring with the fifth polynomial in the first ring to produce a first multiplication result further includes: mapping the third polynomial into seventh polynomial in a third ring and an eighth polynomial in a forth ring using the map; mapping the fifth polynomial into a ninth polynomial in the third ring and a tenth polynomial in the fourth ring using the map; multiplying the seventh polynomial in the third ring with the ninth polynomial in the third ring to produce a third multiplication result; multiplying the eighth polynomial in the fourth ring with the tenth polynomial in the fourth ring to produce a fourth multiplication result using Renes multiplication; and combining the second multiplication result and the fourth multiplication result using the map to produce the first multiplication result.

Various embodiments are described, wherein the first ring is $\mathbb{Z}[X]/(X^{N/2}-1)$, the second ring is $\mathbb{Z}[X]/(X^{N/2}+1)$, the third first ring is $\mathbb{Z}[X]/(X^{N/4}-1)$, and the fourth ring is $\mathbb{Z}[X]/(X^{N/4}+1)$.

Various embodiments are described, wherein the first polynomial and the second polynomial are of order N, the third polynomial, fourth polynomial, fifth polynomial, and sixth polynomial are of order N/2, and the seventh polynomial, eighth polynomial, ninth polynomial, and tenth polynomial are of order N/4.

Various embodiments are described, wherein the cryptographic operation is a lattice-based cryptographic operation.

Further various embodiments relate to a data processing system comprising instructions embodied in a non-transitory computer readable medium, the instructions for multiplying a first and a second polynomial in the ring $\mathbb{Z}[X]/(X^N-1)$ to perform a cryptographic operation in a processor, the instructions, including: instructions for receiving the first polynomial and the second polynomial by the processor; instructions for mapping the first polynomial into a third polynomial in a first ring and a fourth polynomial in a second ring using a map; instructions for mapping the second polynomial into a fifth polynomial in the first ring and a sixth polynomial in the second ring using the map; instructions for multiplying the third polynomial in the first ring with the fifth polynomial in the first ring to produce a first multiplication result; instructions for multiplying the fourth polynomial in the second ring with the sixth polynomial in the second ring to produce a second multiplication result using Renes multiplication; and instructions for combining the first multiplication result and the second multiplication result using the map.

Various embodiments are described, wherein the first ring is $\mathbb{Z}[X]/(X^{N/2}-1)$, and the second ring is $\mathbb{Z}[X]/(X^{N/2}+1)$.

Various embodiments are described, wherein the first polynomial f is $f=f_0+X_{N/2} f_1$ in the ring $\mathbb{Z}[X]/(X^N-1)$, wherein $f_0$ is a lower portion of the first polynomial and $f_1$ is an upper portion of the first polynomial, the third polynomial is $f_0+f_1$ in the first ring, and fourth polynomial is $f_0-f_1$ in the second ring.

Various embodiments are described, wherein the first polynomial and the second polynomial are of order N and the third polynomial, fourth polynomial, fifth polynomial, and sixth polynomial are of order N/2.

Various embodiments are described, wherein the instructions for multiplying the third polynomial in the first ring with the fifth polynomial in the first ring to produce a first multiplication result further includes: instructions for mapping the third polynomial into seventh polynomial in a third ring and an eighth polynomial in a forth ring using the map; instructions for mapping the fifth polynomial into a ninth polynomial in the third ring and a tenth polynomial in the fourth ring using the map; instructions for multiplying the seventh polynomial in the third ring with the ninth polynomial in the third ring to produce a third multiplication result; instructions for multiplying the eighth polynomial in the fourth ring with the tenth polynomial in the fourth ring to produce a fourth multiplication result using Renes multiplication; and instructions for combining the second multiplication result and the fourth multiplication result using the map to produce the first multiplication result.

Various embodiments are described, wherein the first ring is $\mathbb{Z}[X]/(X^{N/2}-1)$, the second ring is $\mathbb{Z}[X]/(X^{N/2}+1)$, the third first ring is $\mathbb{Z}[X]/(X^{N/4}-1)$, and the fourth ring is $\mathbb{Z}[X]/(X^{N/4}+1)$.

Various embodiments are described, wherein the first polynomial and the second polynomial are of order N, the third polynomial, fourth polynomial, fifth polynomial, and sixth polynomial are of order N/2, and the seventh polynomial, eighth polynomial, ninth polynomial, and tenth polynomial are of order N/4.

Various embodiments are described, wherein the cryptographic operation is a lattice-based cryptographic operation.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
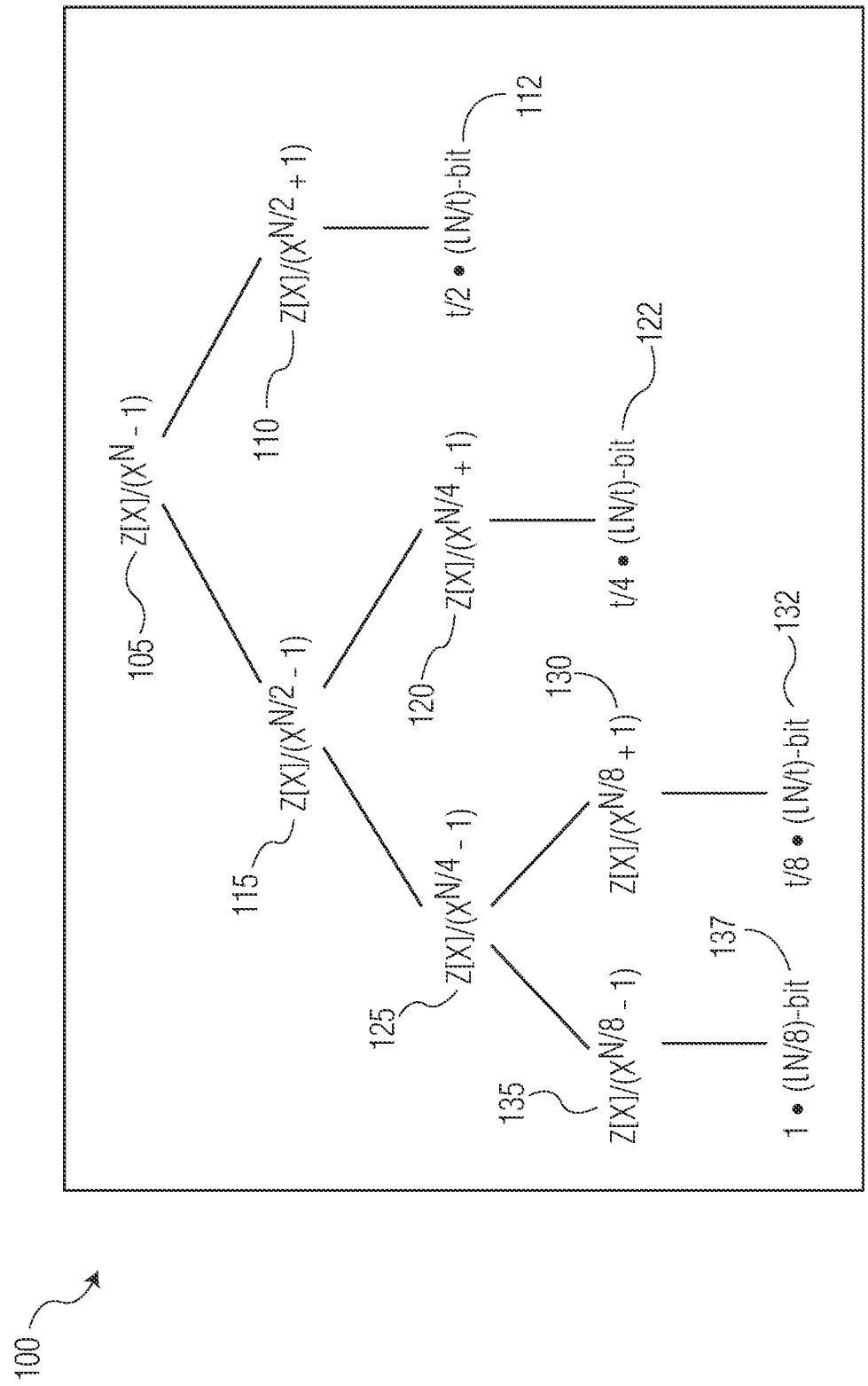
FIG. 1 illustrates a tree structure showing the recursive splitting of a multiplication to reduce the length of the multiplications required.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Lattice-based cryptography supports various commonly used cryptographic functionality such as exchanging secret keys, digital signatures, encryption, and decryption. In addition, lattice-based cryptography supports other cryptographic functionality such as homomorphic encryption, and the like. Lattice-based cryptography has many practical applications such as establishing secure connections over a network (e.g., the internet), guaranteeing the integrity of software (e.g., when updating or booting a device) and performing cryptographic operations on encrypted data in the cloud. When implemented in either hardware or software, many lattice-based constructions work on polynomials that are generated from random user input or publicly known seeds to enhance performance and reduce memory requirements. For example, in various lattice-based cryptographic schemes, such as for example, an asymmetric cryptography scheme using a pair of keys, a user's private key of the key pair includes a vector of polynomials having coefficients that are sampled randomly. A public key of the key pair is a matrix of polynomials having coefficients that are either public or generated from a public seed. The longest arithmetic operations carried out by these implementations are multiplications involving two polynomials, and the operations may be repeated several times. The polynomials typically have a fixed, or finite, number of coefficients, while the coefficients themselves lie in a modular ring, such as the integers modulo a prime or a power of two. These are properties of the particular cryptographic scheme and are fixed by parameters of the scheme. Therefore, a need exists for a method to multiply two polynomials for a cryptographic application efficiently using existing co-processors.

A method to reduce polynomial multiplications in $\mathbb{Z}[X]$ to integer multiplication was proposed by a mathematician named L. Kronecker as set out in "Grundzüge einer arithmetischen theorie der algebraischen grössen, Journal für die reine and angewandte" Mathematik 92 (1882), 1-122. This approach is known as the Kronecker substitution method. In the approach, given two polynomials $f, g \in \mathbb{Z}[X]$ of degree (up to) $n-1 \in \mathbb{Z}$, the goal is to compute the polynomial multiplication $h=f \cdot g$. Kronecker's idea is to evaluate the polynomials at a sufficiently high power of two (e.g., $f(2^l)$ and $g(2^l)$) and use the resulting integers as input for a regular integer multiplication by computing $h(2^l)=f(2^l) \cdot g(2^l)$. Finally, the resulting integer $h(2^l)$ is converted back to its polynomial representation $h \in \mathbb{Z}[X]$. The result is correct if the coefficients of the resulting polynomial did not "mix" with each other, i.e., if the parameter $l \in \mathbb{Z}$ is sufficiently large. An advantage of this approach, computing a polynomial multiplication with an integer multiplication, is that well-studied and fast implementations of asymptotic integer multiplication methods can be used.

The size of the integers multiplied in the Kronecker procedure is strongly related to the size of l. Simply put, the larger l, the larger the integers, and the variable l needs to be above a certain threshold in order to avoid "mixing" of the polynomial coefficients and rendering the result incorrect. A mathematician named David Harvey observed in an article entitled "Faster Polynomial Multiplication Via Multipoint Kronecker Substitution" in the Journal of Symbolic Computation 44 (2009), no. 10, 1502-1510, incorporated herein by reference for all purposes, that the size of l can be reduced by splitting up the polynomial evaluation into two parts. Assuming for simplicity that l is even, and given f, g ∈ ℤ [X], David Harvey computes $$h(2^{l_2}) = f(2^{l_2}) \cdot g(2^{l_2}),$$

$$h(-2^{l_2}) = f(-2^{l_2}) \cdot g(-2^{l_2}),$$

where $l_2 = l/2$. David Harvey then observes that $$h^{(0)}(2^l) = (h(2^{l_2}) + h(-2^{l_2}))/2,$$

$$h^{(1)}(2^l) = (h(2^{l_2}) - h(-2^{l_2}))/(2 \cdot 2^{l_2}),$$

where $h^{(i)}$ denotes the polynomial whose jth coefficient equals the $(2j+1i)$th coefficient of h. In other words, $$h^{(0)}(2^l) = \sum_{j=0}^{n/2-1} h_{2j} 2^{jl}, \text{ and } h^{(1)}(2^l) = \sum_{j=0}^{n/2-1} h_{2j+1} 2^{jl}.$$

The coefficients of h can therefore be recovered as the l-bit limbs $h^{(0)}(2^l)$ and $h^{(1)}(2^l)$. Denoting by M(b) the cost of multiplying two b-bit integers, this approach changes the cost of the polynomial multiplication in ℤ [X] from M(l·n)+O(l·n) in the case of standard Kronecker, to 2·M(l·n/2)+O(l·n). Here the O terms represent overhead and the cost of packing and unpacking. This has significant advantages whenever the cost of multiplying is more expensive than linear in n. Harvey also considers a second approach to split up the evaluation into four parts by also evaluating at the reciprocal $f(2^{-l/4})$, which gives rise to multiplication with a cost of 4·M(l·n/4)+O(l·n).

In an article entitled "Implementing RLWE-based schemes using an RSA co-processor," by Martin R. Albrecht, Christian Hanser, Andrea Hoeller, Thomas Poppelmann, Fernando Virdia, and Andreas Wallner, (IACR Transactions on Cgptographic Hardware and Embedded Systems, 2019 (1), 169-208), incorporated herein by reference for all purposes, the authors repurpose existing RSA/ECC co-processors for (ideal) lattice-based cryptography with polynomial modulus $m(X) = X^{256}+1$. The assumption is that one has access to a co-processor which can provide efficient modular arithmetic for large moduli (up to a couple thousand bits). The idea is to apply Kronecker substitution (including the signed variant and the multi-point evaluation) to compute arithmetic in $R_q$ using the existing co-processors.

In the U.S. patent application Ser. No. 16/884,136 filed on May 27, 2020 to Joost R. Renes et al. entitled "Method For Multiplying Polynomials For A Cryptographic Operation" (hereafter "Renes"), the observation is made that $\zeta = X^{2N/t}$ is a principal t-th root of unity in the ring $\mathbb{Z}[X]/(X^N+1)$. Hence the lN-bit multiplication can now be reduced through Kronecker to t multiplications of lN/t bits each. Using the notation from above, the cost goes from M(l·N)+O(l·N) to t·M(l·N/t)+O(l·N). This is done by evaluating f and g at $\zeta^i \cdot 2^{l/t}$ for i=0, 1, . . . t−1 as opposed to only $2^l$ and multiplying the respective factors modulo $X^{N/t}+1$. Renes is incorporated by reference for all purposes as if included herein.

More specifically, the integers $$h(\zeta^i 2^{l/t}) = f(\zeta^i 2^{l/t}) \cdot g(\zeta^i 2^{l/t}) \mod(2^{lN/t}+1), \ 0 \le i \le t-1,$$

are computed and it is noted that $$h^{(i)}(2^l) \equiv \frac{\sum_{j=0}^{t-1} \zeta^{i(t-j)} h(\zeta^j \cdot 2^l t)}{2^{il_t} \cdot t} \mod(2^{l_t n}+1),$$

where $$h^{(i)}(2^l) = \sum_{j=0}^{n/t-1} h_{tj+i} 2^{jl}.$$

To recover h, the appropriate l-bit limbs can be read off from the $h^{(i)}$. The method for multiplying polynomials in the ring $\mathbb{Z}[X]/(X^N+1)$ as described above and in more detail in Renes will hereafter be called Renes multiplication. The use of the Renes multiplication allows for the multiplication of polynomials in the ring $\mathbb{Z}[X]/(X^N+1)$ to be computed more efficiently and may take advantage of existing cryptographic co-processors.

The main arithmetic operations used in lattice-based cryptography include polynomial multiplication in the ring $(\mathbb{Z}/q\mathbb{Z})[X]/(m(X))$ where typically $q < 2^{32}$. This makes it hard to directly apply the existing fast and hardened arithmetic co-processors designed for classical public-key cryptography such as ECC and RSA. Embodiments well be described herein that can make use of this existing hardware efficiently. In contrast to the approach taken in Renes that addressed the case where $m(X) = X^N+1$ for N some power of 2, the embodiments described herein address the more complicated case of $m(X) = X^N-1$ for N some power of 2 that allows application to a wider variety of lattice-based schemes being considered for post-quantum standardization.

Computing polynomial arithmetic using integer arithmetic is not new: Kronecker substitution is a well-known technique which achieves this. The embodiments disclosed herein extend the tools which one can use for Kronecker by using the properties of the special ring $\mathbb{Z}[X]/(X^N-1)$ used in lattice-based cryptography. Although this ring does not initially have nice principal roots of unity that are needed for number theoretic transforms (NTT), the embodiments described herein show how to use the map $$\psi: \mathbb{Z}[X]/(X^N-1) \to \mathbb{Z}[X]/(X^{N/2}-1) \times \mathbb{Z}[X]/(X^{N/22}+1)$$

to recursively apply the Renes multiplication to reduce lN-bit multiplications to t (approximately) lN/t-bit multiplications for positive integers t (that are powers of 2). This is much faster compared to the state-of-the-art and allows for the efficient re-use of existing hardware co-processors.

In Renes multiplication, it is crucial that in the ring $\mathbb{Z}[X]/(X^N+1)$ the element $(= X^{2N/t}$ is a principal t-th root of unity. Not only does this allow the application of an NTT, but also when applying Kronecker substitution, the element $\zeta$ is mapped to $2^{2lN/t}$ which is a power of 2 allowing for efficient computations. This implies that multiplications by (powers of) $\zeta$ can be replaced by very computationally inexpensive bit shifts.

The same idea does not immediately apply when moving to the ring $\mathbb{Z}[X]/(X^N-1)$, as is not principal. Although alternative principal roots of unity exist, they will not correspond to powers of 2 when evaluated at $2^l$ in Kronecker substitution. Therefore multiplications by its powers will be very costly. How to avoid that problem will now be illustrated.

The main construction is based on the map $$\psi_0: \mathbb{Z}[X]/(X^N-1) \to \mathbb{Z}[X]/(X^{N/2}-1) \times \mathbb{Z}[X]/(X^{N/2}+1),$$

$$f=f_0+X^{N/2}f_1 \to (f_0+f_1, f_0-f_1).$$

This is initially not an isomorphism, but will be when extended to coefficients over $\mathbb{Q}$ (using CRT) with inverse $\psi_0^{-1}:(\hat{f}_0,\hat{f}_1) \mathbb{Z}((\hat{f}_0+\hat{f}_1)/2, (\hat{f}_0-\hat{f}_1)/2)$. This ensures that $\psi_0^{-1}(\psi_0(f))=f$ for any $f \in \mathbb{Z}[X]/(X^N-1)$, which suffices for purposes of this approach. It can also be viewed as a degree 2 NTT with (principal) root of unity $-1 \in \mathbb{Z}$. This (combined with Kronecker) would reduce the lN-bit multiplication to 2 multiplications of lN/2 bits each.

Now Renes multiplication may be applied to the multiplication in $\mathbb{Z}[X]/(X^{N/2}+1)$ with (t/2)-th root of unity $X^{N/t}$, reducing the (lN/2)-bit multiplication to t/2 multiplications of lN lt bits each. What remains is to perform an lN/2-bit multiplication in $\mathbb{Z}[X]/(X^{N/2}-1)$. Now recursion may be applied, using the map $$\psi_1: \mathbb{Z}[X]/(X^{N/2}-1) \to \mathbb{Z}[X]/(X_{N/4}-1) \times \mathbb{Z}[X]/(X_{N/4}+1),$$

$$f=f_0+X^{N/4}f_1 \to (f_0+f_1, f_0-f_1),$$

which splits $\mathbb{Z}[X]/(X^{N/2}-1)$ up into two multiplications of lN/4 bits each, one in $\mathbb{Z}[X]/(X^{N/4}-1)$ and one in $\mathbb{Z}[X]/(X^{N/4}+1)$. Again applying Renes multiplication to $\mathbb{Z}[X]/(X^{N/4}+1)$ reduces the computation to t/4 multiplications of lN/t bits each. Continuing, the single lN/t-bit multiplication is reduced to t-1 multiplications in $\mathbb{Z}[X]/(X^{N/t}+1)$ and a single multiplication in $\mathbb{Z}[X]/(X^{N/t}-1)$, all of which are lN/t-bits.

FIG. 1 illustrates a tree structure showing the recursive splitting of a multiplication to reduce the length of the multiplications required. First, a multiplication in $\mathbb{Z}[X]/(X^N-1)$ 105 is split into a multiplication in $\mathbb{Z}[X]/(X^{N/2}-1)$ 115 and a multiplication in $\mathbb{Z}[X]/(X^{N/2}+1)$ 110. The multiplication in $\mathbb{Z}[X]/(X^{N/2}+1)$ 110 may be computed using Renes multiplication and requires t/2 multiplications of lN/t bits each 112. Next, the multiplication in $\mathbb{Z}[X]/(X^{N/2}-1)$ 115 is split into a multiplication in $\mathbb{Z}[X]/(X^{N/4}-1)$ 125 and a multiplication in $\mathbb{Z}[X]/(X^{N/4}+1)$ 120. The multiplication in $\mathbb{Z}[X]/(X^{N/4}+1)$ 120 may be computed using Renes multiplication and requires t/4 multiplications of lN lt bits each 122. Then, the multiplication in $\mathbb{Z}[X]/(X^{N/4}-1)$ 125 is split into a multiplication in $\mathbb{Z}[X]/(X^{N/8}-1)$ 135 and a multiplication in $\mathbb{Z}[X]/(X^{N/8}+1)$ 130. The multiplication in $\mathbb{Z}[X]/(X^{N/8}+1)$ 130 may be computed using Renes multiplication and requires t/8 multiplications of lN lt bits each 132. At this point, the multiplication in $\mathbb{Z}[X]/(X^{N/8}-1)$ 135 may be computed requiring 1 multiplication of l N/8 bits 137. In FIG. 1 t=8, but other values may be chosen to further iterate the splitting the process. The splitting may continue until the number of bits in the multiplication is less than the number of bits that an available co-processor is able to handle.

The computational complexity will now be described. For a Kronecker exponent l and a co-processor with word size w, computing the operation $f \to (f_0+f_1, f_0-f_1)$ in $\mathbb{Z}[X]/(X^{2N/k}-1)$ has a cost of $2 \cdot lN/(kw)$ additions. Further, computing Renes multiplication in $\mathbb{Z}[X]/(X^{N/k}+1)$ has a cost of $lN/tw \cdot (t/k)\log(t/k)$ additions, where t is the total depth. Summing up all the parts (e.g., as done in FIG. 1), a total cost is calculated as $$\sum_{i=1}^{\log t} \frac{2\ell N}{2^i w} + \sum_{i=1}^{\log t-1} \frac{\ell N}{tw} \frac{t \log(t/2^i)}{2^i} = \frac{\ell N}{w} \sum_{i=1}^{\log t} \frac{(2+\log t-i)}{2^i} = \frac{\ell N \log t}{w}.$$

As the Renes multiplication has cost $t \log t \cdot lN/(tw)$, the costs are seen to be equal but allows one to apply existing large number co-processors to a wider variety of cryptographic schemes.

Now a concrete example will be given of how to map a polynomial by splitting it into a "lower part" $f_0$ and an "upper part" $f_1$. For example with N=8, define $$f=1+2x+3x^2+4x^3+5x^4+6x^5+7x^6+8x^7.$$

Then Using the Map Define $$f_0=1+2x+3x^2+4x^3,$$

and $$f_1=5+6x+7x^2+8x^3.$$

Here it can be seen that $f_0$ and $f_1$ have half the degree of f and that their coefficients correspond exactly to those of f. This works for an N that is divisible by 2.

Once f has been expressed as $f=f_0+x^{N/2}f_1$, f may be mapped it to two different rings. The first ring is $\mathbb{Z}[X]/(X^{N/2}-1)$ which essentially means a ring where $X^{N/2}-1=0$ or $X^{N/2}=1$. Mapping to that ring means that $X^{N/2} \to 1$, so that $f_0+X^{N/2}f_1 \to f_0+f_1$. In the first ring $\mathbb{Z}[X]/(X^{N/2}-1)$ calculations are done using $f_0+f_1$.

The other ring is $\mathbb{Z}[X]/(X^{N/2}+1)$ which is a ring where $X^{N/2}=-1$. In this case $X^{N/2} \to -1$, so $f_0+X^{N/2}f_1 \to f_0-f_1$. In the second ring $\mathbb{Z}[X]/(X^{N/2}+1)$ calculations are done using $f_0-f_1$.

If $F_0=f_0+f_1$ and $F_1=f_0-f_1$, it can be seen that $2f=(F_0+F_1)+X^{N/2}(F_0-F_1)$. So f may be retrieved by adding and subtracting $F_0$ and $F_1$ and accounting for the factor of 2. So, the basic intuition is that any polynomial f can be split into two parts with an addition and subtraction, and it may be recovered from its two halves also with an addition and subtraction.

This mapping also behaves very well with respect to multiplication. If $f=f_0+X^{N/2}f_1$ and $g=g_0+X^{N/2}g_1$, f and g may be split into $(f_0+f_1, f_0-f_1)$ and $(g_0+g_1, g_0-g_1)$. Now multiply the two parts separately to get $((f_0+f_1)(g_0+g_1), (f_0-f_1)(g_0-g_1))$.

Finally perform the reconstruction step:

$$(f_0+f_1)(g_0+g_1)+(f_0-f_1)(g_0-g_1)=2(f_0g_0+f_1g_1);$$

$$(f_0+f_1)(g_0+g_1)-(f_0-f_1)(g_0-g_1)=2(f_0g_1+f_1g_0).$$

The polynomial $2(f_0g_0+f_1g_1)+2X^{N/2}(f_0g_1+f_1g_0)$ is recovered based upon the mapping defined above.

On the other hand, multiplying f and g directly gives $f \cdot g=f_0g_0+X^{N/2}(f_0g_1+f_1g_0)+X^N f_1g_1$. In the ring $\mathbb{Z}[X]/(X^N-1)$ $X^N=1$, so $f \cdot g=(f_0g_0+f_1g_1)+X^{N/2}(f_0g_1+f_1g_0)$ modulo $X^N-1$. This is the same polynomial above except for a factor 2, which can easily be accounted for.

Figure 2:
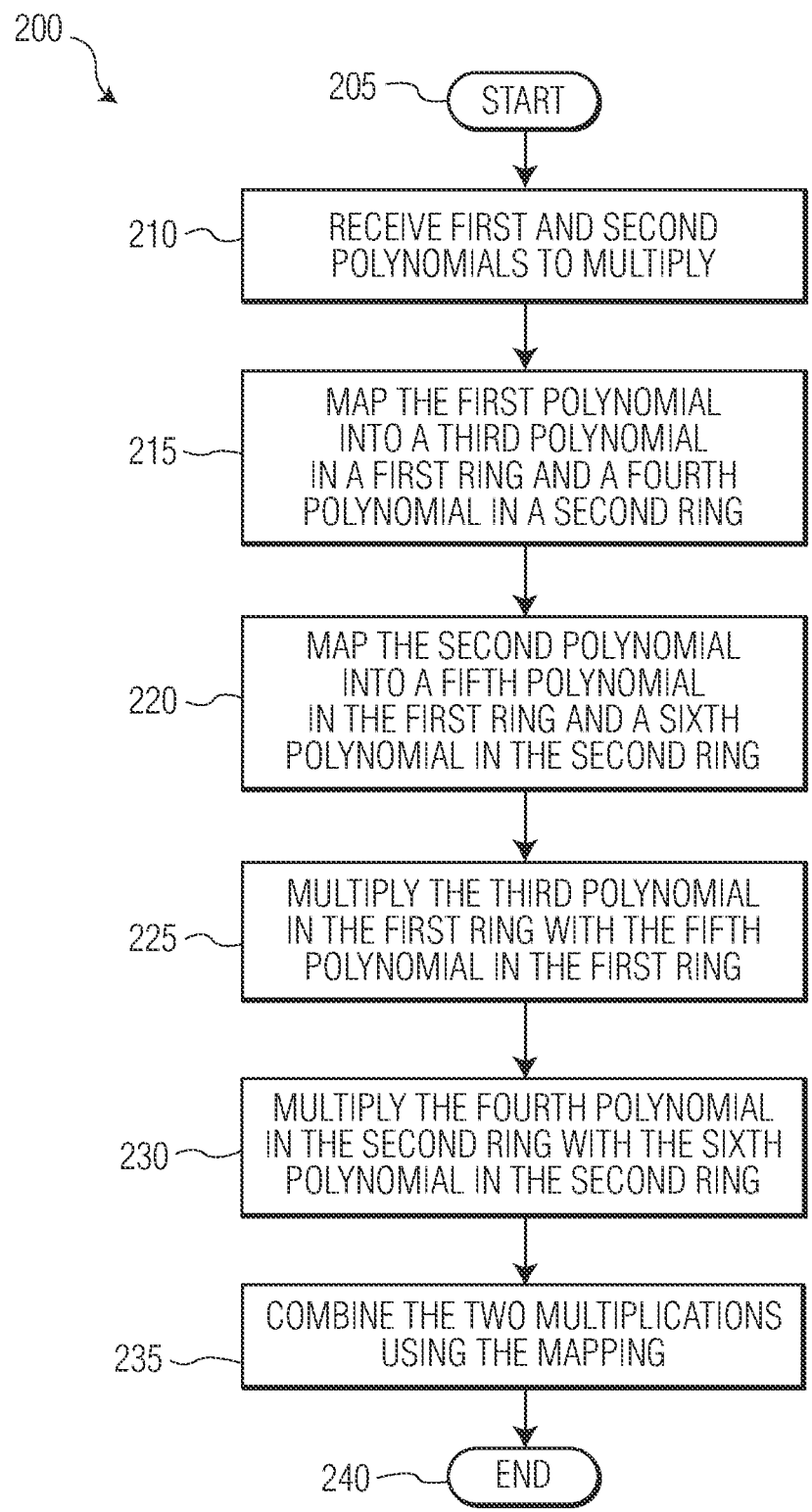
FIG. 2 illustrates a flow diagram for performing the multiplication of two polynomials by a processor.

FIG. 2 illustrates a flow diagram for performing the multiplication of two polynomials by a processor. The multiplication 200 starts at step 205. Then the processor receives the first and second polynomials to multiply 210. Then the processor maps the first polynomial into a third polynomial in a first ring and a fourth polynomial in a second ring 215. This may be done using the mapping $$\psi_0: \mathbb{Z}[X]/(X^N-1) \to \mathbb{Z}[X]/(X^{N/2}-1) \times \mathbb{Z}[X]/(X^{N/2}+1),$$

$$f=f_0+X^{N/2}f_1 \to (f_0+f_1, f_0-f_1)$$

described above. Next, the processor maps the second polynomial into a fifth polynomial in the first ring and a sixth polynomial in the second ring 220 in the same manner as the first polynomial. The processor then multiplies the third polynomial in the first ring with the fifth polynomial in the first ring 225. Next, the processor multiplies the fourth polynomial in the second ring with the sixth polynomial in the second ring 230. The multiplication in the second ring may use Renes multiplication to efficiently perform this multiplication. Finally, the processor combines the two multiplications done in the two rings using the mapping to result in the multiplication of the two polynomials 235 and then stops 240.

Methods 100 and 200 may use existing fast and hardened arithmetic co-processors designed for known public-key cryptography such as ECC and RSA. As described above, the method applies number theoretic transform (NTT) techniques and roots of unity to the Kronecker setting which results in a faster and more efficient solution on processors designed for RSA and ECC calculations.

Figure 3:
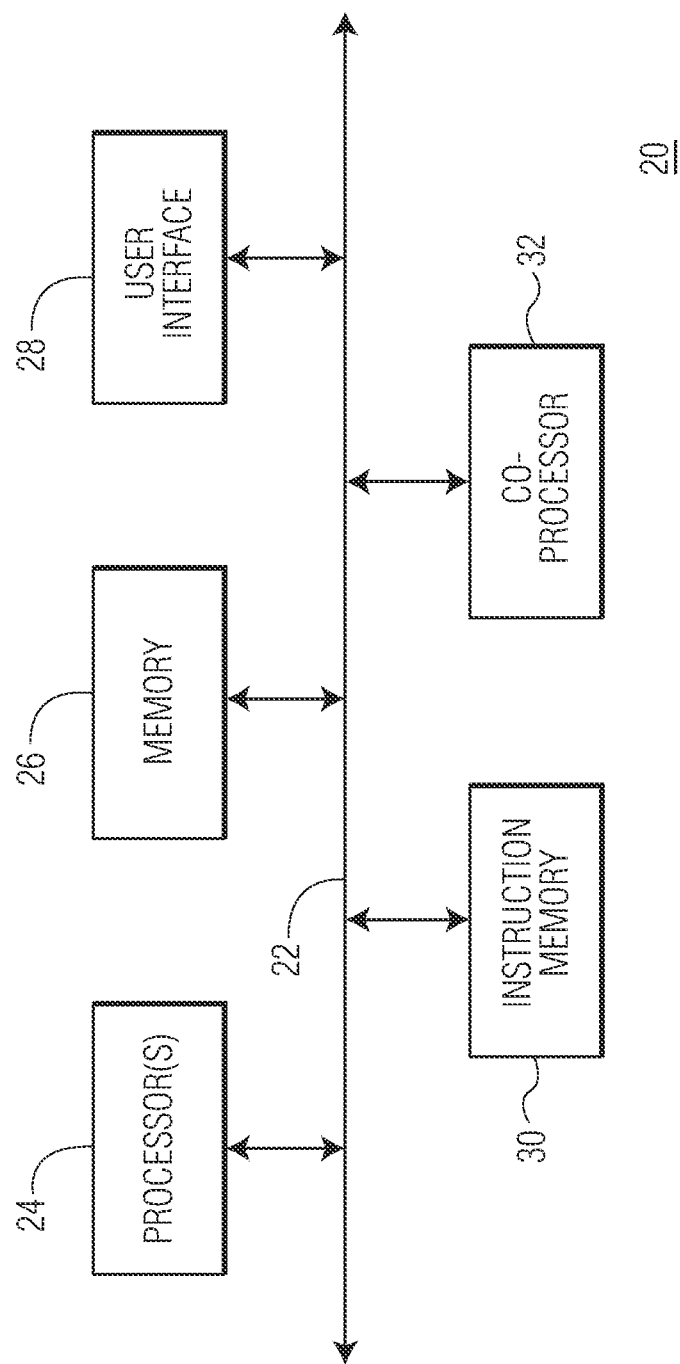
FIG. 3 illustrates, in block diagram form, data processing system including a co-processor for multiplying two or more polynomials in accordance with an embodiment.

FIG. 3 illustrates, in block diagram form, data processing system 20 including a co-processor 32 for multiplying two or more polynomials in accordance with an embodiment. Data processing system 20 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 20 may include metal-oxide semiconductor (MOS) transistors fabricated using a conventional complementary metal-oxide semiconductor (CMOS) process. In another embodiment, data processing system 20 may include other transistor types, such as bipolar, and may be manufactured with a different process.

Data processing system 20 includes communication bus 22, processor(s) 24, memory 26, and cryptography co-processor 32. Bus 22 may be a conventional bus having a plurality of conductors for communicating address, data, and control information. In other embodiments, bus 22 may be an interconnect structure such as for example, a cross-bar switch or other form of interconnect system. Processor(s) 24 is bi-directionally connected to bus 22. Processor(s) 24 may include one or more of any type of processing element, a processor core, microprocessor, microcontroller, field-programmable gate arrays (FPGAs), application-specific integrated circuits (ASICs), digital signal processor, and the like. There can be any number of processors.

Memory 26 is bi-directionally connected to bus 22. Memory 26 can be one or more of any type of volatile or non-volatile memory. Examples of memory types include non-volatile memories such as flash, one-time programmable (OTP), EEPROM (electrically erasable programmable read only memory), and the like. Volatile memory types include static random-access memory (SRAM) and dynamic random-access memory (DRAM). The memory may be used for storing instructions and/or data.

User interface 28 is bi-directionally connected to bus 22 and may be connected to one or more devices for enabling communication with a user such as an administrator. For example, user interface 28 may be enabled for coupling to a display, a mouse, a keyboard, or other input/output device. User interface 28 may also include a network interface having one or more devices for enabling communication with other hardware devices external to data processing system 20.

Instruction memory 30 may include one or more machine-readable storage media for storing instructions for execution by processor(s) 24. In other embodiments, both memories 26 and 30 may store data upon which processor(s) 24 may operate. Memories 26 and 30 may also store, for example, encryption, decryption, and verification applications. Memories 26 and 30 may be implemented in a secure hardware element and may be tamper resistant.

Co-processor 32 is bi-directionally connected to bus 22. Co-processor 20 may be a special type of a co-processor optimized for running encryption/decryption security software according to the RSA, ECC, or Advanced Encryption Standard (AES) or other type of commonly used encryption algorithm. Accordingly, and in accordance with the described embodiments, co-processor 32 may be used to efficiently execute instructions for performing polynomial multiplications for post-quantum cryptography as discussed above and illustrated in the flowchart of FIG. 1. The algorithm executed on co-processor 32 may be used to encrypt/decrypt data and instructions in data processing system 20.

The polynomial comparator and method described herein provides a technological solution to improving ability to multiply two polynomials in rings of the form of $\mathbb{Z}[X]/(X^N-1)$ as required in many post-quantum cryptographic systems. The polynomial multiplier uses a mapping function to map the polynomials to be multiplied into smaller polynomials over two different rings that have an order of N/2. One mapped polynomial is over a ring $\mathbb{Z}[X]/(X^{N/2}+1)$, and the multiplication of polynomials over this ring may be efficiently calculated using Renes multiplication. The other mapped polynomial is over a ring $\mathbb{Z}[X]/(X^{N/2}-1)$. If the word size of such multiplication is larger than the word size of the available cryptographic co-processor, then the polynomials are further split again, and this process is repeated as described in FIG. 1 until word size of the polynomial over a ring $\mathbb{Z}[X]/(X^{N/t}-1)$ fits within the available cryptographic co-processor. This allows for multiplication over a ring $\mathbb{Z}[X]/(X^N-1)$ to be split into multiplications that may fit within the available cryptographic co-processor and greatly reduces the size of the multiplications required as described above. This is an improvement over other methods that allow for the use of available cryptographic co-processors to carry out small multiplications so that the polynomial multiplications may be carried out more efficiently.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A computer implemented method for multiplying a First and a second polynomial in the ring $\mathbb{Z}[X]/(X_N-1)$ and performing a cryptographic operation in a data processing system, the method executed using a hardware processor of the data processing system, comprising:
    receiving the first polynomial and the second polynomial by the hardware processor;
    mapping the first polynomial into a third polynomial in a first ring and a fourth polynomial in a second ring using a map;
    mapping the second polynomial into a fifth polynomial in the first ring and a sixth polynomial in the second ring using the map;
    multiplying the third polynomial in the first ring with the fifth polynomial in the first ring to produce a first multiplication result;
    multiplying the fourth polynomial in the second ring with the sixth polynomial in the second ring to produce a second multiplication result using Renes multiplication;
    combining the first multiplication result and the second multiplication result using the map,
    wherein the first ring is $\mathbb{Z}[X]/(X_{N/2}+1)$,
    wherein the second ring is $\mathbb{Z}[X]/(X_{N/2}+1)$, and
    performing a post-quantum cryptography operation using the hardware processor including executing a verification, encryption, or decryption operation using the multiplication of the first polynomial and the second polynomial with integer coefficients.

2. The method of claim 1, wherein
    the first polynomial f is $f=f_0+X^{N/2}f_1$ in the ring $\mathbb{Z}[X]/(X_N-1)$, wherein $f_0$ is a lower portion of the first polynomial and $f_1$ is an upper portion of the first polynomial,
    the third polynomial is $f_0+f_1$ in the first ring, and
    fourth polynomial is $f_0-f_1$ in the second ring.

3. The method of claim 1, wherein the first polynomial and the second polynomial are of order N and the third polynomial, fourth polynomial, fifth polynomial, and sixth polynomial are of order N/2.

4. The method of claim 1, wherein multiplying the third polynomial in the first ring with the fifth polynomial in the first ring to produce a first multiplication result further comprises:
    mapping the third polynomial into seventh polynomial in a third ring and an eighth polynomial in a forth ring using the map;
    mapping the fifth polynomial into a ninth polynomial in the third ring and a tenth polynomial in the fourth ring using the map;
    multiplying the seventh polynomial in the third ring with the ninth polynomial in the third ring to produce a third multiplication result;
    multiplying the eighth polynomial in the fourth ring with the tenth polynomial in the fourth ring to produce a fourth multiplication result using Renes multiplication; and
    combining the second multiplication result and the fourth multiplication result using the map to produce the first multiplication result.

5. The method of claim 4, wherein
    the third first ring is $\mathbb{Z}[X]/(X^{N/4}-1)$, and
    the fourth ring is $\mathbb{Z}[X]/(X^{N/4}+1)$.

6. The method of claim 4, wherein
    the first polynomial and the second polynomial are of order N,
    the third polynomial, fourth polynomial, fifth polynomial, and sixth polynomial are of order N/2, and
    the seventh polynomial, eighth polynomial, ninth polynomial, and tenth polynomial are of order N/4.

7. The method of claim 1, wherein the cryptographic operation is a lattice-based cryptographic operation.

8. A data processing system comprising instructions embodied in a non-transitory computer readable medium, the instructions for multiplying a first and a second polynomial in the ring $\mathbb{Z}[X]/(X_N-1)$ and performing a cryptographic operation using a hardware processor, the instructions executed by the hardware processor, comprising:
    instructions for receiving the first polynomial and the second polynomial by the processor;
    instructions for mapping the first polynomial into a third polynomial in a first ring and a fourth polynomial in a second ring using a map;
    instructions for mapping the second polynomial into a fifth polynomial in the first ring and a sixth polynomial in the second ring using the map;
    instructions for multiplying the third polynomial in the first ring with the fifth polynomial in the first ring to produce a first multiplication result;
    instructions for multiplying the fourth polynomial in the second ring with the sixth polynomial in the second ring to produce a second multiplication result using Renes multiplication;
    instructions for combining the first multiplication result and the second multiplication result using the map,
    wherein the first ring is $\mathbb{Z}[X]/(X_{N/2}-1)$, and
    wherein the second ring is $\mathbb{Z}[X]/(X_{N/2}+1)$,
    instructions for performing a post-quantum cryptography operation using the hardware processor including executing a verification, encryption, or decryption operation using the multiplication of the first polynomial and the second polynomial with integer coefficients.

9. The data processing system of claim 8, wherein
the first polynomial f is $f=f_0+X^{N/2}f_1$ in the ring $\mathbb{Z}[X]/(X^N-1)$, wherein $f_0$ is a lower portion of the first polynomial and $f_1$ is an upper portion of the first polynomial,
the third polynomial is $f_0+f_1$ in the first ring, and
fourth polynomial is $f_0-f_1$ in the second ring.

10. The data processing system of claim 8, wherein the first polynomial and the second polynomial are of order N and the third polynomial, fourth polynomial, fifth polynomial, and sixth polynomial are of order N/2.

11. The data processing system of claim 8, wherein the instructions for multiplying the third polynomial in the first ring with the fifth polynomial in the first ring to produce a first multiplication result further comprises:
   instructions for mapping the third polynomial into seventh polynomial in a third ring and an eighth polynomial in a forth ring using the map;
   instructions for mapping the fifth polynomial into a ninth polynomial in the third ring and a tenth polynomial in the fourth ring using the map;
   instructions for multiplying the seventh polynomial in the third ring with the ninth polynomial in the third ring to produce a third multiplication result;
   instructions for multiplying the eighth polynomial in the fourth ring with the tenth polynomial in the fourth ring to produce a fourth multiplication result using Renes multiplication; and
   instructions for combining the second multiplication result and the fourth multiplication result using the map to produce the first multiplication result.

12. The data processing system of claim 11, wherein
the third first ring is $\mathbb{Z}[X]/(X_{N/4}-1)$, and
the fourth ring is $\mathbb{Z}[X]/(X_{N/4}+1)$.

13. The data processing system of claim 11, wherein
the first polynomial and the second polynomial are of order N,
the third polynomial, fourth polynomial, fifth polynomial, and sixth polynomial are of order N/2, and
the seventh polynomial, eighth polynomial, ninth polynomial, and tenth polynomial are of order N/4.

14. The data processing system of claim 8, wherein the cryptographic operation is a lattice-based cryptographic operation.

* * * * *